United States Patent
Engelsmann et al.

[15] 3,643,100
[45] Feb. 15, 1972

[54] PHOTOCELL CIRCUIT FOR PROVIDING INDICATIONS OF BOTH AVAILABLE LIGHT AND FLASHBULB READINESS

[72] Inventors: Dieter Engelsmann, Unterhaching; Hubert Hackenberg; Johann Putscher; Rolf Strittmatter, all of Munich, Germany

[73] Assignee: AGFA Gevaert Aktiengesellschaft, Leverkusen, Germany

[22] Filed: Feb. 19, 1970

[21] Appl. No.: 12,204

[30] Foreign Application Priority Data

Feb. 21, 1969 Germany .................. P 19 08 653.4

[52] U.S. Cl. .................. 250/214 P, 95/11.5 R, 315/241 P
[51] Int. Cl. .................. G03b 9/70, H01j 39/12, H05b 37/00
[58] Field of Search .................. 95/11.5, 11 L; 250/214 P; 240/1.3; 315/241 P

[56] References Cited

UNITED STATES PATENTS 2,881,685  4/1959  Wagner .................. 95/11.5

Primary Examiner—James W. Lawrence
Assistant Examiner—T. N. Grigsby
Attorney—Michael S. Striker

[57] ABSTRACT

Operational readiness of a flashbulb is indicated by an indicator lamp prior to release of the camera shutter by connecting the flashbulb with a series resistor in the base-emitter circuit of a transistor, whose collector circuit contains the indicator lamp. By a suitable switching arrangement, the circuit may be combined with the camera automatic exposure control circuit. The condition of the battery and the light conditions affecting the exposure may also be tested.

11 Claims, 3 Drawing Figures

*INVENTOR.*
DIETER ENGELSMANN
HUBERT HACKENBERG
JOHANN PUTSCHER
ROLF STRITTMATTER

BY

Michael S. Steiler
Attorney

PHOTOCELL CIRCUIT FOR PROVIDING INDICATIONS OF BOTH AVAILABLE LIGHT AND FLASHBULB READINESS

BACKGROUND OF THE INVENTION

This invention relates to an arrangement for indicating the operational readiness of light flash generating means associated with a photographic camera.

Some arrangements are already known for indicating the operational readiness of a flashbulb by use of the current drawn by the bulb. A burnt-out flash bulb activates a blocking arrangement for blocking the camera release. This blocking of the release contact by, for example, a burnt-out flashbulb, has the disadvantage that the indication of whether a flashbulb is operational or nonoperational is only given after the camera release has been activated. This may be particularly disadvantageous when it is desired to photograph rapidly. Furthermore, the blocking of the camera release cannot be taken as a definite indication that the flashbulb is burned out, since the release button will also be blocked when the film has not been transported.

SUMMARY OF THE INVENTION

It is an object of the present invention to render a rapid and definite indication of the operational readiness of light flash generating means associated with a photographic camera.

Thus the present invention is an arrangement for indicating the operational readiness of light flash generating means in a photographic camera having a release contact for initiating a light flash by said light flash generating means. It comprises a switching element having an input circuit and an output circuit. A voltage source furnishes the energy for energizing said switching element. Connecting means connect the light flash generating means to the input circuit of the switching element, while the indicator means is connected to the output circuit of the switching element. A resistor may be inserted in series with the light flash generating means. A single-throw switch is provided for connecting the switching element to the voltage source. When said single-throw switch is activated, the indicator means, for example, an indicator lamp, immediately indicate the electrical condition of the flashbulb. The flashbulb may for example be arranged in the input circuit in such a manner that the indicator lamp does not light when the flashbulb is in operational condition, while a burnt-out or damaged flashbulb causes the indicator lamp to light. The indication follows rapidly and reliably and requires a minimum of circuit elements.

Furthermore, a photosensitive element may be connected in parallel to the flashbulb and its series resistor by means of a selector switch. Since the resistance of such an element varies in dependence upon the light falling thereon, proper mounting of the photosensitive element to receive the light available for an exposure, will cause a high resistance to be in parallel with the flashbulb and its series resistance when insufficient light is present for an exposure. However, if an operational flashbulb is in parallel with this high photoelectric resistance, the overall parallel resistance will be low, causing the indicator lamp to be extinguished. Thus a nonlighting of the indicator lamp indicates that sufficient light will be available for an exposure.

The switching element may, for example, be a transistor. The indicator lamp may be connected in the collector circuit of the transistor, while the flashbulb, or other light flash generating means, in series with a resistor, are connected from the base to the emitter of said transistor. Further, a resistance may be connected from the base of the transistor to one side of the voltage source. The selector switch may then be used, alternatively, to connect either the photosensitive element or another resistance from the base of the transistor to its emitter, which is connected to the other side of the voltage source. In this case, the condition of the battery may be tested by putting the selector switch onto the second selector position, namely the position wherein the second resistance is connected between base and emitter of the transistor, thus forming a voltage divider with the first resistance. Thus the arrangement in accordance with this invention permits rapid testing of the operational readiness of the light flash generating means, of the condition of the battery, and of the light conditions available for an exposure.

The circuit is so arranged that operation of the camera release contact causes the light flash generating means to be put across the voltage source without any series resistance.

In a further embodiment of the present invention, the arrangement for indicating the operational readiness of the flashbulb may use the circuitry which furnishes the automatic exposure control in the camera. In this case, the flashbulb with the series resistor is connected in the input circuit of the exposure control arrangement. For indicating the operational readiness of the flashbulb, the indicator lamp indicating insufficient light for an exposure in the exposure control arrangement, may be utilized. In this case, the arrangement for indicating the operational readiness of a flashbulb would utilize an extremely small number of additional electrical components.

In a further embodiment of the arrangement according to this invention, a delay capacitor may be connected in parallel to the flashbulb and its series resistor upon activation of third switching means, namely, a selector switch operable in conjunction with the camera release contact. This causes the operation of the indicator lamp to be delayed by a time interval depending upon the charging rate of the delay capacitor. When a transistor is used as switching element, the delay capacitor may be connected between its base and its emitter.

Use of such a capacitor yields the advantage that the ignition of a flash is possible even when the voltage source, or battery, has undergone considerable use resulting in a decrease in possible power output. At the moment of activation of the camera release, the indicator lamp, whose resistance in a nonoperative condition is rather low, does not light up, since the delay capacitor constitutes a short circuit for the switching element at that moment. Thus the flashbulb is ignited first. Only after the capacitor has charged sufficiently that the voltage divider in the base circuit of the transistor becomes effective, can the indicator lamp draw current. The time at which the indicator lamp lights is so chosen that it follows the end of the ignition process in the flashbulb. If the camera release contact is not activated, but only the single-throw switch for energizing the testing arrangement, then the delay capacitor is not connected into the circuit.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
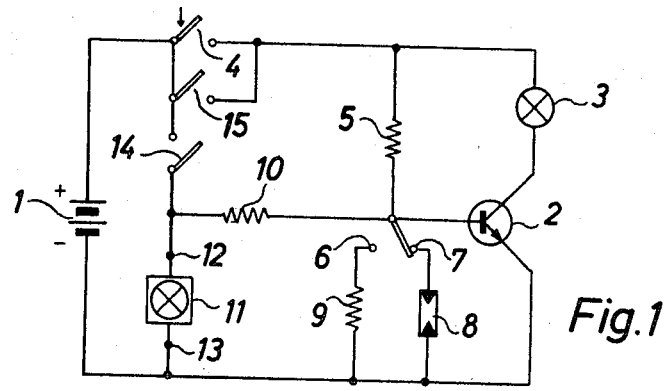
FIG. 1 shows a circuit arrangement permitting an indication of operational readiness of the flash unit, of insufficient light for an exposure, and of the operating condition of the battery.

The preferred embodiment of the arrangement according to this invention will now be described with reference to the drawing.

FIG. 1 shows a voltage source, a battery 1, whose negative terminal is connected with the emitter of a transistor 2. An indicator lamp 3, one embodiment of indicator means, is connected in the collector circuit of transistor 2. A single-throw switch 4 connects the positive terminal of the battery 1 to one terminal of the indicator lamp 3 when closed. The switch may be operable by a button on the camera. The base of transistor 2 is connected to a resistance 5 on the one hand, and via a first selector switch, having contacts 6 and 7, to either a photosensitive element, or photoresistance, 8, or, when in a second selector position, to a resistance 9. The other terminal of the photoresistance 8 and the resistance 9 are connected to a negative battery terminal. Thus the resistance 5 and the photoresistance 8 constitute a voltage divider, when the selector switch is in the first selector position. This corresponds to contact 7 being closed, as shown in FIG. 1. When the selector switch is in position 6, resistances 5 and 9 constitute a voltage divider which is used for testing the battery. Furthermore, the base of transistor 2 is connected to a resistor 10, which is connected in series with a flashbulb 11, one embodiment of light flash generating means. Reference numerals 12 and 13 indicate the terminals of the flashbulb. When a flashbulb is in place, the flashbulb, together with its resistor 10, is connected in parallel either to the photoresistance 8 or to the resistance 9. Of course, a flashcube may be used as light flash generating means instead of the flashbulb. The release contact of the camera is denoted by numeral 14. The selector switch having contacts 6 and 7 is operated simultaneously with a further contact 15, which is connected in parallel with contact 4.

The circuit arrangement depicted in FIG. 1 operates as follows:

It is first assumed that sufficient light is present for an exposure and that a flashcube is inserted between terminals 12 and 13. In order to test whether sufficient light is present for an exposure, the contact 4 is closed, for example via a nonillustrated button on the camera. The resistance of photoresistance 8 is small, when sufficient light is present. Thus the base of transistor 2 is negative relative to its emitter and the indicator lamp 3 does not light. However, even if the resistance of photoresistance 8 were high, the indicator lamp would not light when an operational flashbulb 11 is in place, since the resistance of the flashbulb in series with its resistor 10 is sufficiently low that the base of transistor 2 would be negative relative to its emitter, independent of the value of photoresistance 8.

If it is now desired to test the operational readiness of the flashbulb, in the presence of sufficient light, then it is necessary to mask the photoresistance by suitable means, for example, by hand. This is necessary, since the indicator lamp would not light even for an open circuit between terminals 12 and 13, resulting, for example, from a defective flashbulb or from a burnt-out flashbulb, since the low photoresistance 8 would be in parallel therewith. However, masking of the photoresistance 8 increases its resistance value sufficiently, that an open circuit between terminals 12 and 13 would cause the indicator lamp to light, thus indicating to the user that the flashbulb is not in operative condition.

If it is now desired to test the battery, then the selector switch is switched to terminal 6 via a key which is not shown. This activates the contact 15 simultaneously. The voltage divider comprising resistors 5 and 9 is dimensioned that the indicator lamp will light as long as the voltage furnished by the battery exceeds a predetermined minimum value. Thus, the lighting of the lamp indicates to the user that sufficient battery voltage is available. However, if the indicator lamp does not light after the contacts 6 and 15 are closed, then a new battery must be used.

If it is now assumed that the light conditions are insufficient, and that no flashbulb 11 is present between terminals 12 and 13, then the indicator lamp 3 will light because of the relatively high resistance of photoresistance 8. After insertion of the flashbulb 11, terminals 12 and 13 are electrically connected. Therefore the low resistance of the flashbulb, in series with resistor 10, is inserted in parallel with the relatively high resistance of photoresistance 8, causing the indicator lamp 3 to extinguish. Extinguishing of indicator lamp 3 thus indicates to the user that the arrangement is ready for operation. After contact 14 is closed, the flashbulb is ignited and a current step flows therethrough. After ignition of the flashbulb 11, the contact between terminals 12 and 13 is broken. Therefore, the relatively high resistance of the photoresistor 8 again becomes effective causing the indicator lamp 3 to relight. Only when a new flashbulb is inserted, or the flashcube has been moved to a new position, will the indicator lamp 3 again be extinguished.

Figure 2:
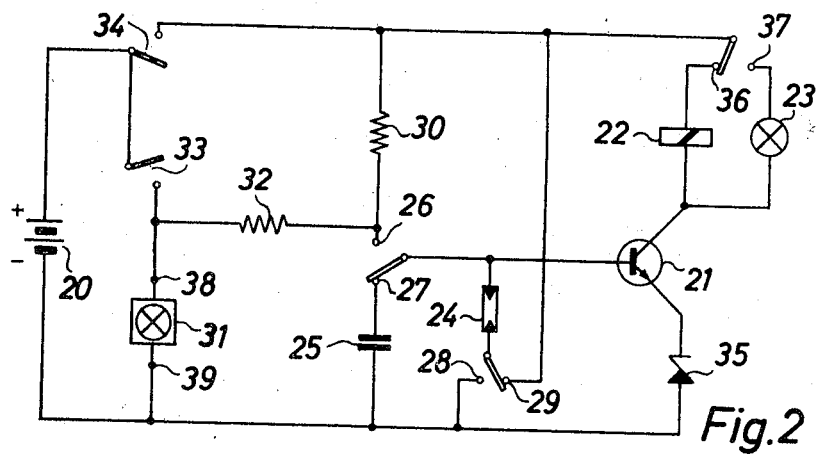
FIG. 2 shows a schematic diagram of an exposure control arrangement, which may also be used to indicate the operational readiness of the flash unit and the light conditions by means of appropriate switching arrangements.

In FIG. 2, an exposure control arrangement is shown. This consists of a DC voltage source 20, and a switching element, namely a transistor 21, having a collector, an emitter and a base. Connection between the positive signal of the voltage source and the collector of the transistor 21 is furnished by either a switching magnet 22 or an indicator lamp 23, in dependence on the position of second switching means, namely a selector switch having contacts 36 and 37, respectively connecting the switching magnet or the indicator lamp into the collector circuit of transistor 21. The exposure control arrangement or circuit further comprises a timing circuit consisting of a capacitor 25 and a photoresistance 24. The capacitor 25 has one terminal connected to the negative side of the DC voltage source 20 and the other terminal connected to a terminal 27 which is part of a selector switch whose other terminal is a terminal 26 connected to the positive terminal of battery 20 by means of a resistance 30 and also directly connected to one terminal of a resistance 32 which is the resistor in series with the light flash generating means 31. Terminals 26 and 27 are part of first switching means. The movable arm of the selector switch of which they are a part is connected to the base of transistor 21 and also to one terminal of the photoresistance 24 whose other terminal is connected via the movable arm of another selector switch, also forming part of the first switching means to either a terminal 28 connected to the negative side of the battery 20 or a terminal 29 connected to the positive side of battery 20 via a single-throw switch 34. For exposure control, the capacitor 25 is connected in series with the photoresistance 24, i.e., first switching means connect to terminals 27 and 29. When the circuit is to be used as an indicator circuit, the first switching means is switched to the position not shown in FIG. 2, that is, contact is made to contact 26 and 28. In this position the resistance 30 and the photoresistor form a voltage divider for furnishing a voltage to the base of transistor 21. Also, the light flash generating means 31 in series with the resistor 32 are in parallel with photoresistance 29 when the first switching means are in this position. Contact 34, in series with the positive side of battery 20, serves to connect the indicator circuit to the battery when in a closed position, while contact 33 is the release contact and serves to connect the flashbulb 31 directly across the battery enclosed. If the first switching means and the position indicated in FIG. 2, as stated above, the arrangement serves as an exposure control circuit. Closing of contact 34 serves to energize the circuit. Upon closing of contact 34, the capacitor 25 first serves to short circuit the base of transistor 21 to the negative side of the battery 20, causing the switching magnet 22 to remain inactive. After a time interval determined by the resistance of photoresistance 4 and the capacity of capacitor 25, transistor 21 becomes conductive, causing the switching magnet 22 to become activated. This is the case when the voltage at capacitor 25 exceeds the voltage of the zener diode 35 connected between the emitter of transistor 21 and the negative side of battery 20. Activation of the switching magnet 22 causes the shutter to close. This is a conventional operation which is not part of the present invention and is therefore not shown here in detail.

If the first switching means are moved to the position not shown in FIG. 2, that is if contact is made with contacts 26 and 28, then both the capacitor 25 and the switching magnet 22 are disconnected from the circuit, while the indicator lamp 23 is connected into the collector circuit of transistor 21. If insufficient light is available for an exposure, the resistance of photoresistance 24 is relatively large, causing the voltage between the base and the emitter of transistor 21 to be positive. Thus transistor 21 is conductive and the indicator lamp 23 lights. It will be noted in FIG. 2 that the light flash generating means are connected between terminals 38 and 39. If these points are now electrically connected through the insertion of a flashbulb, then a low resistance 32 in series with the resistance of the flashbulb is connected in parallel with photoresistance 24. This causes the voltage of the base relative to the emitter of transistor 21 to become negative, causing the indicator lamp 23 to extinguish. If contact 33 is then closed, the flashbulb ignites. After ignition, the connection between terminals 38 and 39 is broken, causing the voltage at the base of transistor 21 to be determined by photoresistance 24 only. This causes the indicator lamp 23 to relight. Insertion of a new flashbulb, or the rotating of the flashcube, causes the potential at the base of transistor 1 to decrease again, thus causing the indicator lamp 23 to reextinguish. Therefore the camera (not shown) is again ready for operation with flash lighting.

Figure 3:
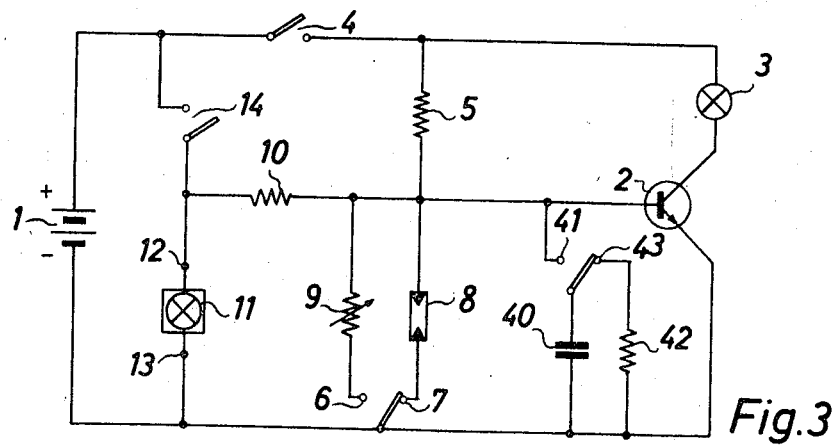
FIG. 3 shows a circuit arrangement corresponding to FIG. 1, but including an additional delay capacitor.

The circuit shown in FIG. 3 corresponds in the main to the circuit shown in FIG. 1. Corresponding components therefore have the same reference numerals as in FIG. 1. However, an additional capacitor 40, a delay capacitor, is provided in FIG. 3 which was absent in FIG. 1. This capacitor may be connected to he base of transistor 2 by means of third switching means having a contact 41 connected to the base of transistor 2. A second contact of the third switching means, to which the delay capacitor may alternatively be connected, connects this capacitor in parallel with a resistance 42 whose other terminal is connected to the negative side of the battery 1. It is the function of delay capacitor 40 to delay the lighting of the indicator lamp 3 under conditions of insufficient light and in the presence of a flashbulb between terminals 12 and 13 for a predetermined time interval after closing of the relief contact 14. The predetermined time interval depends upon the resistance of resistor 5 and the capacitance of delay capacitor 40. The movable arm of the third switching means, namely the arm connecting the terminal of capacitor 40 to contact 41, is coupled to the contact 14 activated by the release contact. Thus upon closing of the contact 14, the flashbulb 11 ignites, but transistor 2 is not switched to its conducting state until after a time interval determined by the above-mentioned resistance 5 and capacitance 40. Thus, the indicator lamp 3 can draw current from the battery 1 only after this predetermined time interval. This yields the advantage that the flashbulb 11 and the indicator lamp 3 draw current one after another, instead of simultaneously. This is a distinct advantage when the battery 1 has a lowered power output due to longtime use. After release of relief contact 14, the contact 43 is closed, allowing capacitor 40 to discharge over resistance 42.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. Arrangement for indicating the operational readiness of light flash generating means associated with a photographic camera having a release contact for initiating a light flash by said light flash generating means, comprising, in combination, a switching element having an input circuit and an output circuit; a voltage source for energizing said switching element; indicator means connected to said output circuit; connecting means connecting said light flash generating means to said input circuit in such a manner that the indication of said indicator means prior to activation of said release contact in said camera depends upon the operational state of said light flash generating means; photosensitive means mounted to receive light reflected from the object to be photographed; resistor means connected in series with said light flash generating means; and a selector switch means for connecting said photosensitive element in parallel with said light flash generating means and said resistor means in a first selector position, whereby said indicator means also furnish an indication of available light.

2. An arrangement as set forth in claim 1, wherein said indicator means are an indicator lamp.

3. An arrangement as set forth in claim 1, further comprising a single-throw switch means connecting said voltage source to said switching element when in a first state, and disconnecting said voltage source from said switching element in a second state.

4. An arrangement as set forth in claim 3, wherein said switching element is part of an exposure control circuit of said photographic camera; and wherein said indicator means are the indicator lamp used to indicate the sufficiency of available light for an exposure by said photographic camera.

5. An arrangement as set forth in claim 4, wherein said exposure control circuit comprises a timing circuit, and shutter-operating means; first switching means for alternatively connecting said timing circuit or said light flash generating means to said input circuit of said switching element; and second switching means for alternatively connecting said shutter-operating means or said indicator means to said output circuit of said switching element.

6. An arrangement as set forth in claim 5, wherein said switching element is a transistor; wherein said timing circuit comprises a photoresistance mounted to receive light available for a photographic exposure; a capacitor connected in series with said photoresistance, the base of said transistor being connected to the common point of said photoresistance and said capacitor; and wherein said shutter-operating means comprise a magnetic coil connected to the collector of said transistor.

7. An arrangement as set forth in claim 1, further comprising a second resistor connected in parallel with said light flash generating means and said resistor when said selector switch is in a second selector position, whereby the indication on said indicator means depends upon the voltage furnished by said voltage source.

8. An arrangement as set forth in claim 7, further comprising means for preventing the simultaneous operation of said light flash generating means and said indicator means.

9. An arrangement as set forth in claim 8, wherein said means for preventing the simultaneous operation of said light flash generating means and said indicator means comprise a delay capacitor; and third switching means for connecting said delay capacitor parallel with said light flash generating means and said resistor, whereby operation of said indicator means is delayed for a time interval depending upon the charging time of said delay capacitor.

10. An arrangement as set forth in claim 9, wherein said third switching means are mechanically coupled to said release contact, for connecting said delay capacitor in parallel with said light flash generating means and said resistor upon activation of said release contact.

11. An arrangement as set forth in claim 10, wherein said switching element is a transistor having a base, emitter, and collector; wherein said delay capacitor is connected between said base and said emitter of said transistor by said third switching means upon activation of said release contact, whereby said transistor becomes conductive upon attainment of a predetermined minimum of resistance between the terminals of said light flash generating means, and a predetermined minimum charge upon said delay capacitor.

* * * * *